United States Patent [19]

Flannaghan

[11] Patent Number: 4,703,358

[45] Date of Patent: Oct. 27, 1987

[54] APPARATUS FOR PROCESSING A TELEVISION SIGNAL INCLUDING A MOVEMENT DETECTOR

[75] Inventor: Barry A. Flannaghan, Hampshire, United Kingdom

[73] Assignee: Independent Broadcasting Authority, England

[21] Appl. No.: 800,614

[22] PCT Filed: Mar. 26, 1985

[86] PCT No.: PCT/GB85/00117

§ 371 Date: Nov. 15, 1985

§ 102(e) Date: Nov. 15, 1985

[87] PCT Pub. No.: WO85/04542

PCT Pub. Date: Oct. 10, 1985

[30] Foreign Application Priority Data

Mar. 26, 1984 [GB] United Kingdom ............... 8407764

[51] Int. Cl.[4] ............................................. H04N 5/21
[52] U.S. Cl. .................................. 358/167; 358/160; 358/105; 358/174
[58] Field of Search ............... 358/160, 166, 167, 36, 358/37, 21 R, 105, 136, 174, 179

[56] References Cited

U.S. PATENT DOCUMENTS 3,621,129 11/1971 Fisher .
3,890,462 6/1975 Limb et al. ...................... 358/105
4,096,525 6/1978 Lathan ........................... 358/105
4,218,704 8/1980 Netravali et al. ................ 358/136
4,272,787 6/1981 Michael et al. .................. 358/105
4,307,420 12/1981 Ninomiya et al. ............... 358/105
4,369,464 1/1983 Temine .......................... 358/105
4,500,911 2/1985 Ninomiya et al. ............... 358/167

OTHER PUBLICATIONS

IEEE Trans Communications, vol. COM-26, No. 10, Oct. 1978 (New York, U.S.) Kouji Kinuhata et al; "Digital Standards Converter by Adaptive Intra-Frame Line Interpolation", pp. 1413-1419, see p. 1415, paragraphs 2,3; p. 1417, paragraph 3,3.

Primary Examiner—Tommy P. Chin
Attorney, Agent, or Firm—Watson, Cole, Grindle & Watson

[57] ABSTRACT

A movement detector is included in television signal processing apparatus in order to improve the performance of the apparatus. The detector evaluates an absolute frame difference signal on a sample by sample basis and, after comparison with a threshold level signal in order to remove the effects of noise is fed to an isolated point removal circuit where samples deemed to indicate movement are compared with surrounding samples and if identified as isolated are ignored. Adaptive control is provided if the threshold, the isolated point removal circuit and a quantizer circuit for non-linearly altering the frame difference signal.

19 Claims, 1 Drawing Figure

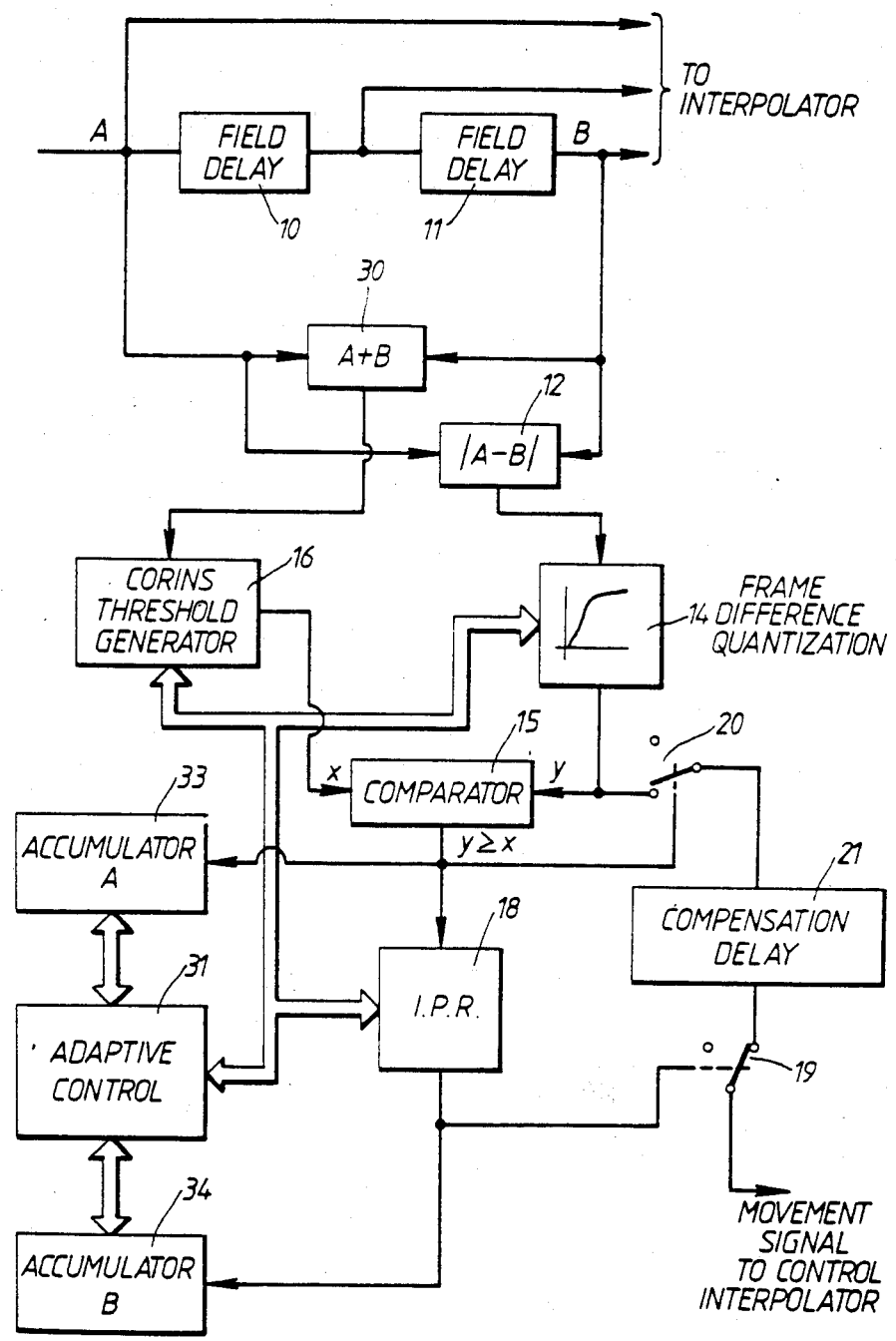

APPARATUS FOR PROCESSING A TELEVISION SIGNAL INCLUDING A MOVEMENT DETECTOR

BACKGROUND OF THE INVENTION

1. Field of the Invention

The present invention relates to apparatus for processing a television signal including a movement detector.

A major improvement in the television picture quality may be achieved by upconverting the line interlace format of the transmission system to a sequential format prior to display. The frame rate or number of pictures displayed every second may also be increased. The choice of interpolation scheme used to fill in the missing lines or frames will depend on the presence or absence of movement in the local area. Consider only upconversion to a sequential or double line rate non-interlace format. In a static scene temporal interpolation would be used to fill in the missing lines but if there was movement present this scheme would cause blurring and edge "fringing". For significant movement on interpolation scheme taking account of only vertically adjacent samples must be employed. If vertical interpolation were to be used for a static scene it would negate the main advantage of upconversion, that is, the removal of edge flicker.

SUMMARY OF THE INVENTION

The present invention provides apparatus for processing a television signal comprising a movement detector and an interpolator whose operation is responsive to an output from the movement detector, said movement detector including means for delaying a television signal, and means for comparing a current television signal (A) which a delayed television signal (B) and producing an output signal K indicative of the comparison, said output signal being fed to the interpolator whereby to control its operation.

One approach would be to use the absolute frame difference:

$$K = |A - B|$$

where A and B are the magnitudes of the temporally adjacent luminance samples. A small value for K would indicate a static scene and a large value a moving scene. Under certain circumstances this approach will give an incorrect indication of movement due to interlace. This may be compensated for elsewhere in the receiver.
Noise Noise in the received video will be reflected in the value 'K'. This may be a serious problem in the upconverter since ideally we would wish to signal low amplitude movement which generates only small values for 'K'. These may be hidden in noise, so resulting in a random selection of the interpolation scheme. The subjective effect of this is to considerably increase the "noise" in the picture.

The dominant source of noise in the receiver will be from the FM satellite transmission channel. This is so because the video source will typically be a studio RGB camera, telecine, or in the near future components VTR's. The carrier to noise power ratio, (C/N), of the extended definition MAC Link, (Bandwidth 11 MHz) in a typical receiver will be of the order of 18-20 dB. This subjectively corresponds to a C/N figure of 16-18 dB in a standard MAC channel which is equivalent to an unweighted luminance to noise ratio of 31.6-33.6 dB.

One way of preventing much of the nosie on movement signal 'K' effecting the interpolation is to apply a coring threshold to 'K'. Any frame differences below this threshold would be assumed to be noise and consequently ignored. The problem here is that for the relatively high levels of noise introduced by the satellite link a high threshold would be necessary. In the instance of a received carrier to noise power ratio of 20 dB, it is found necessary to set the coring level to about 5% of peak video amplitude. The change from the temporal to vertical only interpolation must be gradual; abrupt changes will add visible noise, so that in this example vertical only interpolation is not implemented with a frame difference of less than about 10% of peak video amplitude. Coring of this order overcomes the problem of "interpolation added noise", but the process has severely degraded the performance of the upconverter with movement in the scene. A 10% change in luminance level between successive pictures would be typical of moving sharp edge of low contrast or a soft edge of higher contrast. Thus such moving edges within the scene may be "ignored" by the movement signal, or with similar subjective degradation may be on the verge of positive detection and so cause interpolation noise.

BRIEF DESCRIPTION OF THE DRAWINGS

Features and advantages of the present invention will become apparent from the following description of an embodiment thereof given by way of example with reference to the accompanying drawing which is a block diagram of a movement detector according to the present invention.

DETAILED DESCRIPTION OF THE PREFERRED EMBODIMENT

A local movement detector comprises two field delay circuits 10 and 11 for delaying input samples of a television signal either in analogue or digital form. The delay circuits 10 and 11 are controlled so that an instantaneous sample A fed to the detector can be processed together with an identically positioned sample B but from the previous frame.

In order to indicate movement the magnitudes of the samples A and B are fed to an absolute frame difference circuit 12 whose output is fed via a quantizing circuit 14 to a comparator 15 where the output of the quantizing circuit 14 is compared with a reference signal produced by a threshold generator circuit 16.

The output of the comparator is connected to an output of the detector through an isolated point removal circuit 18 whose operation will be described in more detail later and a switch 19. It is also connected through a switch 20 and a compensating delay circuit 21 to the output of the detector circuit.

The operation of the above circuit will become apparent later. Suffice to say that the performance of the above described circuit can be improved by rendering the threshold generating circuit 16 adjustable by connecting it to the output of a circuit 30 which sums the samples A and B.

Further, the circuit can be rendered adaptive by providing an adaptive control circuit 31 for controlling the threshold generating circuit 16, the quantizing circuit 14 and the isolated point removal circuit 18. The control circuit 31 receives inputs from the output of the comparator 15 and the circuit 18 via accumulators 33 and 34 respectively.

It will be recalled that in the description of noise given previously it is found that a higher than ideal threshold appears to be necessary. However, if a way of determining a noise and therefore erroneous frame difference value is found then it would be possible to reduce the initial coring threshold. Consequently the movement sensitivity would be increased. The circuit 18 carries out Isolated Point Removal (IPR).

This is a process by which a frame difference which is greater than the coring threshold but surrounded by frame differences below the threshold is assumed to be noise and thus ignored. There are four basic schemes for IPR:

(a) Horizontal IPR

This is the simplest scheme to implement as it observes only the immediately adjacent differences in the horizontal direction. If these are both below threshold then the centre difference is also assumed to be below the threshold whatever its actual level. The effectiveness of this scheme is greatly enhanced by the characteristic triangular noise spectrum of the FM link. This results in a high probability that a noise spike in 'K' will pesist above an average level threshold for single sample time, where the sample time is close to the Nyquist limit for the video bandwidth. If 'K' remains above the threshold for more than one sample time it will not be affected by this circuit. The drawback of this scheme is that it will also cause 'true' movement signals to be ignored when they are above threshold for a single sample time only. This is the case with a horizontally moving sharp edge.

(b) Vertical IPR

With this scheme the vertically adjacent differences, 'K', are observed. The same criterion is applied as for horizontal IPR to determine a noise sample. Given similar conditions this scheme will be slightly more effective than horizontal IPR owing to the noise on vertically adjacent samples, 64 μs apart, being uncorrelated. As the spatial distance between lines on the same field in greater than that between samples horizontal, this scheme is likely to ignore more true vertical movement than the horizontal IPR is likely to remove true horizontal movement. To counter this, it is generally found that there is more horizontal than vertical movement in a typical television scene.

It is interesting to note that if the video originated in PAL and contains high levels of cross-luminance then vertical IPR will tend to reject it from the movement signal. This is as a result of the 8 field sequence for subcarrier phase producing horizontal single line stripes in the frame difference signal in areas of saturated colour.

(c) Two dimensional IPR—The following are two novel schemes for IPR which are particularly suited to the improved local movement detector.

(i) In this scheme the adjacent values for 'K' vertically and horizotally are considered. The condition that all four of these differences must be below threshold for the central difference to be assumed to be also below threshold. The advantage here is that virtually no true movement will be ignored. With a low threshold level for the prevailing conditions, causing many noise differences to pass through the corer, this scheme will obviously be less effective than either of the two previous schemes. At a correspondingly high threshold the effectiveness will be comparable.

(ii) As with (Ci) but using the criterion that either pair of adjacent differences need be below threshold for the centre difference to be ignored. This scheme is very effective at low thresholds but consequently removes much true movement information. Subjectively this may be the optimum scheme in high noise conditions since the loss of movement information is a trade against the reduction of interpolation noise, caused by random switching of interpolation scheme.

Table 1 gives results obtained with these schemes on a static picture passed through the standard MAC channel at 16 dB C/N. Adaptive Control The noise level in a typical DBS receiver may be constantly varying due to many factors. Inherent noise level variations may be caused by changes in temperature, humidity and the orbital position of the satellite; these account for typically less than 2 dB overall. However, in a low cost receiver installation other factors such as dish mounting stability, temperature changes affecting the front end and dish shape may add a similar variation to the received carrier to noise power ratio. In view of the possible variation in C/N adaptive control of the local movement detector isemployed in the drawing. A further advantage of adaptive control is that it will also help prevent further degradation of a picture that is noisy at source. Video sources in general have a concentration of noise at high frequencies owing to aperture correction and pre-emphasis. Thus noise rejection schemes applied to FM noise apply also to some video sources.

There are three parameters that have to be determined; these will depend on the prvailing noise level of the receiver:

(a) Frame difference quantization

This represents the non linear law which converts from differences into a usable movement signal. (See the drawing.) In low noise conditions it may subjectively improve the upconverted picture if the change from temporal only to vertical only interpolation is quite abrupt. However, in high noise conditions such an abrupt change will increase the level of "interpolation added" noise in the scene. A less abrupt change with the consequential movement impairment may be subjectively more acceptable.

(b) Coring threshold

Ideally this should be low to give reasonable sensitivity to movement, though for good noise rejection at low C/N this is not possible. Also we may wish to alter the threshold dependent on the brightness of the scene to take account of the eyes differing sensitivity to disturbances in bright and dark areas. An approximation to the local brightness of the scene may be obtained from the frame sum.

(c) IPR Scheme

From the earlier discussion of IPR it was seen that the optimum choice of scheme is dependent on the level of noise in the receiver.

The improved local movement detector determines the prevailing noise level by either monitoring the AGC line of the front end, which obviously takes no account of the source noise, or by a method of direct measurement as follows: After pre-setting a typical value for the coring threshold the number of frame differences that exceed this level over a fixed period of time, are accumulated in an Accumulator A in the drawing. This value is stored in the adaptive control processors memory and the accumulator reset. With repeating this sequence many times a minimum value for the number of frame differences above threshold may be obtained. This minimum will coincide with the scene with the least movement present, since noise will average out, and so give a reliable indication of the noise level present. If the minimum value is found to be too large for effective IPR then the coring threshold should be raised. In time the optimum coring threshold will be obtained. As a further enhancement to the adaptive control algorithm the number of differences above threshold that are removed by the IPR circuit may similarly be accumulated in an Accumulator B in the drawing. Information gained by this will indicate for example, whether the normal IPR mode (Ci) is being "overloaded" with noise making mode C(ii) a better choice. Strictly speaking, little information is actually gained by this second accumulation since knowledge of the noise distribution, (Gaussian) and accumulation A will enable the processor to deterine the effectiveness of a particular IPR scheme.

The adaptive control may be achieved at little expense compared with the cost of the frame delay and multipliers for the interpolation, by a microprocessor. Parameters would be changed during the field blanking so avoiding any interruption in the picture. The IPR is also comparatively cheap to implement as it used only a single bit signal (above/below threshold). The only significantly costly part will be the one line delay in the interpolation path required to compensate for the delay introduced by the vertical IPR option. In a production version it may be possible to tap off the main field delays so extra compensating delays would not be required.

The above description has been given in relation to the apparatus handling a television signal being in the form of a component signal such as a multiplexed analogue component signal (MAC). The principles embodied in the apparatus may, however, be used with composite signal systems employing sub-carriers, such as PAL, SECAM or NTSC.

TABLE 1

Results for the four IPR schemes. Measured at 16 dB C/N wtih a static picture.
SCHEME
 (a) Horizontal IPR
 (b) Vertical IPR
 (Ci) 2-Dimensional (both satisfied)
 (Cii) 2-Dimensional (either satisfied)

Column A shows the percentage of differences which exceed the coring threshold while Column B give the percentage of these differences removed by the IPR scheme

| THRESHOLD | SCHEME | A | B |
|---|---|---|---|
| 7.5 | (a) | 37% | 38% |
|  | (b) |  | 39% |
|  | (Ci) |  | 15% |
|  | (Cii) |  | 62% |
| 15.5 | (a) | 6.6% | 77% |
|  | (b) |  | 86% |
|  | (Ci) |  | 67% |
|  | (Cii) |  | 96% |
| 23.5 | (a) | 0.006% | 96% |
|  | (b) |  | 98% |
|  | (Ci) |  | 94% |
|  | (Cii) |  | 100% |

The local movement detector described is able to signal the presence of comparatively low amplitude movement in a video signal that has passed through an F.M. satellite channel with a received carrier to noise power ratio typical of DBS services. To ensure good noise rejection in the movement signal the detector gathers statistical information related to the video which when accumulated over time gives an indication of the noise level. It is then able to choose the optimum noise rejection scheme. This movement detector is primarily intended for use in a sequential scan extended definition MAC receiver, although other applications may be found.

I claim:

1. Apparatus for processing a television signal comprising a movement detector and an interpolator responsive to an output from the movement detector, said movement detector including means for delaying said television signal to produce a delayed television signal, means for comparing a current television signal with said delayed television signal and producing a resultant signal indicative of the comparison, reference means for generating a reference signal, further comparing means for comparing the resultant signal from the first-mentioned comparing means with the reference signal whereby to produce output signals when the resultant signal is greater than the reference signal, said output signals being used to control operation of the interpolator, and modifying means coupled to said interpolator responsive to said output signals for determining when a particular one of said output signals differs from selected others of said output signals for modifying the effect of the output signals accordingly, and control means responsive to the output signal from the further comparing means for automatically altering the reference signal generated by the reference means whereby to reduce erroneous operation due to noise.

2. Apparatus according to claim 1, further comprising a quantizer circuit having an input connected to the first-mentioned comparing means and an output connected to the further comparing means.

3. Apparatus according to claim 2, wherein the control means is connected to the quantizer circuit for controlling its operation.

4. Apparatus according to claim 1, wherein the television signals are samples and the modifying means operates on samples representing horizontally difference portions of a television picture.

5. Apparatus according to claim 1, wherein the television signals are sales and the modifying means operates on samples representing vertically different portions of a television picture.

6. Apparatus according to claim 1, wherein the control means is connected to the modifying means for altering the operation of the modifying means in respose to the output from the further comparing means.

7. Apparatus according to claim 6, wherein the control means is connected to the modifying means to be responsive to the operation thereof and to alter the operation of the modifying means in response to both the comparing means and the modifying means.

8. Apparatus according to claim 2, wherein the television signals are samples and the modifying means operates on samples representing horizontally difference portions of a television picture.

9. Apparatus according to claim 3, wherein the television signals are samples and the modifying means operates on samples representing horizontally difference portions of a television picture.

10. Apparatus according to claim 2, wherein the television signals are samples and the modifying means operates on samples representing vertically different portions of a television picture.

11. Apparatus according to claim 3, wherein the television signals are samples and the modifying means operates on samples representing vertically different portions of a television picture.

12. Apparatus according to claim 4, wherein the television signals are samples and the modifying means operates on samples representing vertically different portions of a television picture.

13. Apparatus according to claim 8, wherein the television signals are samples and the modifying means also operates on samples representing vertically different portions of a television picture.

14. Apparatus according to claim 9, wherein the television signals are samples and the modifying means also operates on samples representing vertically different portions of a television picture.

15. Apparatus according to claim 2, wherein the control means is connected to the modifying means for altering the operation of the modifying means in response to the output from the further comparing means.

16. Apparatus according to claim 3, wherein the control means is also connected to the modifying means for altering the operation of the modifying means in response to the output from the further comparing means.

17. Apparatus according to claim 4, wherein the control means is connected to the modifying means for altering the operation of the modifying means in response to the output from the further comparing means.

18. Apparatus according to claim 5, wherein the control means is connected to the modifying means for altering the operation of the modifying means in response to the output from the further comparing means.

19. Apparatus according to claim 15, wherein the control means is also responsive to both the further comparing means and the modifying means.

* * * * *